Patented Nov. 7, 1933

1,933,945

UNITED STATES PATENT OFFICE 1,933,945

PRODUCTION OF URETHANE SUBSTANCES

Heinrich Ulrich and Karl Saurwein, Ludwigshafen-on-the-Rhine, Germany, assignors to I. G. Farbenindustrie Aktiengesellschaft, Frankfort-on-the-Main, Germany No Drawing. Application February 12, 1932, Serial No. 592,650, and in Germany February 16, 1931

17 Claims. (Cl. 260—106)

The present invention relates to the production of assistants for the textile and allied industries.

We have found that valuable assistants for the textile and allied industries can be obtained by causing aliphatic amino acid i. e. aminocarboxylic acids (X—NH—R—COOH) and aminosulphonic acids (X—NH—R—SO₃H) in which general formulæ X is a hydrogen atom or an alkyl radicle which may contain a hydroxyl group and R is an alkyl radicle, to react with chlorocarbonic esters of primary or secondary mono- or dihydric (open chain or cyclo-) aliphatic alcohols, i. e. of aliphatic alcohols in which the carbon atom bearing the hydroxyl group is directly connected to at least one hydrogen atom. The condensation is preferably carried out in the presence of a quantity of alkali sufficient to neutralize the hydrochloric acid formed, the alkali, such as sodium or potassium hydroxides or carbonates or calcium hydroxide, being usually employed in the form of its aqueous solutions. The reaction is preferably carried out at temperatures between about 0° and about 80° C., the temperature varying with the activity of the initial materials and being raised within the said limits, if the reaction is to be accelerated. For attaining a most uniform reaction the chlorocarbonic ester is preferably introduced, while stirring, into an aqueous solution of the alkali metal salts of the amino acids. By the addition of alkali and the formation of halogen hydride, alkali chlorides are formed as by-products which may be left in the reaction products without impairing their properties or may be removed in any usual and convenient manner. The preparation of the said compounds proceeds smoothly and results in good yields.

Glycocoll, alanine, sarcosine, aminomethane sulphonic acid, aminoethane sulphonic acid (taurine), N-hydroxy-ethyl taurine, N-methyl taurine, N-butyl or N-hexyl taurines and N-hydroxyalkyl amino carboxylic acids, obtainable for example by saponifying nitriles which may be prepared according to our copending application Ser. No. 591,450 filed February 6, 1932, as for example N-hydroxyethyl amino acetic acid, N-hydroxypropyl amino acetic acid, N-hydroxyethyl-amino-C-n-propyl acetic acid

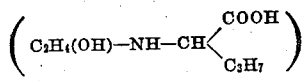

and N-hydroxy-ethyl-amino-C-methyl-ethyl acetic acid, are suitable for example for the reaction. The chlorocarbonic esters may be chosen from those of any mono- or di-hydric alcohols such as methyl, ethyl, propyl or butyl alcohols and glycols such as ethylene, propylene or 1.3-butylene glycols, but we prefer the employment of the chlorocarbonic esters of alcohols containing more than 4 carbon atoms, such as, for example, of amyl, n-hexyl, cyclohexyl, decyl, lauryl, octodecyl, oleyl alcohols, octodecandiol and chlorinated alcohols of the said molecular size, such as dichloroctodecyl alcohol. Even alcohols with a very high number of carbon atoms, such as those obtainable by a catalytic reduction of the acids of Montan wax or those of the oxidation of paraffin wax, paraffin oil or like hydrocarbon mixtures may be used, though chlorocarbonic esters of alcohols containing from 10 to 20 carbon atoms usually give the best results. It is not necessary to employ single esters, but also mixtures prepared from mixtures of different alcohols may be usefully employed for the purposes according to the present invention.

The products apparently correspond to the general formula

in which R denotes an alkyl radicle, X and R₁ denote a hydrogen atom or an alkyl radicle which may contain a hydroxyl group and Y denotes —COOZ or —SO₃Z, Z denoting hydrogen or an alkali metal.

By working in the manner described products are obtained which may be employed especially in the textile, paper, leather and like industries for a great variety of purposes. For example the products are suitable as wetting, dispersing or cleansing agents, for example in washing, fulling, carbonizing, mercerizing, bucking, dyeing and dressing, as well as in the softening of artificial silk and the treatment of hides, or leather; they may be employed in acid, neutral and alkaline treatment baths without any deposits of difficultly soluble salts even when using water containing lime. The said condensation products may be employed with special advantage in the parchmentizing or mercerizing treatment of cotton fabrics or of paper with concentrated sulphuric acid for accelerating wetting out of the cellulose; those prepared from amino sulphonic acids are particularly valuable as washing and scouring agents, whereas those from amino carboxylic acids are useful in softening artificial silk, though both types may be also employed for the same purposes. Thus from 1 to 5 grams of the said substances may be added to each litre of a bath for rendering artificial silk smooth and soft. The said products are also suitable as dispersing agents for dyestuffs, resins, waxes, paraffin oils or waxes, mineral or vegetable oils or fats and organic solvents in liquids in which the said materials are more or less insoluble.

The condensation products may be used as such or together with other substances, such as soaps, Turkey red oils or dispersive sulphuric esters of other aliphatic compounds or sulphonic acids of high molecular aliphatic or aromatic compounds, or with salts, such as perborates, Glauber's salt or tartaric acid salts or with glue, gum arabic or dextrine. The employment of the said condensation products in conjunction with organic solvents, such as cyclohexanol, tetrahydronaphthalene, water-insoluble liquid or solid alcohols, such as butanol or benzyl alcohol, or ketones, is also advantageous.

The following examples will further illustrate how this invention may be carried out in practice, but the invention is not restricted to these examples. The parts are by weight.

Example 1

75 parts of glycocoll are dissolved at room temperature in 534 parts of an aqueous 15 per cent caustic soda solution and then 216 parts of a mixture of equal parts of the chlorocarbonic esters of n-nonyl, n-decyl and n-undecyl alcohols are allowed to drop in at from 20° to 30° C. The urethane mixture formed separates in the form of a solid substance and is separated from the liquid by filtration by suction. The product thus obtained is eminently suitable as a softening agent for artificial silk or leather.

Example 2

75 parts of glycocoll ($H_2N-CH_2-COOH$) are brought into solution at room temperature with 534 parts of 15 per cent caustic soda solution and then about 333 parts of chlorocarbonic acid octodecyl ester

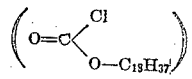

are allowed to drop in at from 20° to 30° C. The reaction product which contains some sodium chloride separates out and is filtered off by suction. It is suitable as a softening agent for artificial silk such as silk from viscose or from acetyl cellulose.

Example 3

75 parts of glycocoll are dissolved in 234 parts of an aqueous 34 per cent caustic soda solution. 163 parts of 1.3-butylene glycol monochlorocarbonic ester are allowed to drop into this solution at from 15° to 20° C. and the whole is stirred at 30° C. until the end of the reaction, viz about an hour. The reaction product is a water-soluble viscous liquid having a slight alkaline reaction.

Example 4

347 parts of octodecandiol monochlorocarbonic ester are allowed to drop at 30° C. into a solution of 162 parts of N-methyl taurine in 234 parts of 17 per cent caustic soda solution. A neutral paste of the corresponding urethane is obtained which is eminently suitable as a washing agent.

Example 5

162 parts of the chlorocarbonic ester of cyclohexanol are allowed to flow slowly while stirring well at from 30° to 40° C. into a solution of 210 parts of the sodium salt of N-butyl-amino-ethane sulphonic acid in 117 parts of 34 per cent caustic soda and 400 parts of water. In order to complete the reaction the whole is heated for a short time to 50° C. A neutral water-soluble liquid is obtained which may be employed as a wetting agent for mercerizing lyes.

Example 6

347 parts of the mono-chlorocarbonic ester of octodecandiol are slowly introduced while stirring at 70° C. into a solution of 141 parts of the sodium salt of hydroxy ethyl glycocoll ($HO-C_2H_4-NH-CH_2-COONa$)

in 234 parts of a 14 per cent aqueous caustic soda solution. A neutral paste containing the sodium salt of the urethane

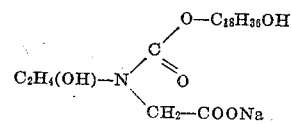

and some sodium chloride is obtained which may be employed as a softening agent for artificial silk.

Example 7

332 parts of the chlorocarbonic ester of octodecyl alcohol are slowly introduced while stirring at 60° C. into a solution of 40 parts of caustic soda and 201 parts of N-hydroxy-ethyl amino-ethane sulphonic acid sodium salt (N-hydroxy-ethyl taurine) in 1000 parts of water. After the whole has been introduced the mixture is heated for about 10 minutes to 80° C. and then left to cool. A white paste is obtained which contains the urethane

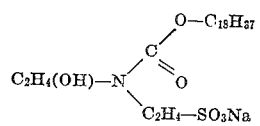

and some sodium chloride and constitutes an efficient washing and scouring agent. Instead of the chlorocarbonic ester of octodecyl alcohol, 401 parts of the chlorocarbonic ester of di-chloro octodeyl alcohol may be employed.

What we claim is:—

1. The process for the production of urethane substances, suitable as assistants for the textile and allied industries, which comprises reacting an aliphatic amino acid, containing at least one hydrogen atom connected to a nitrogen atom, with a chlorocarbonic ester of an aliphatic alcohol in which the carbon atom bearing the hydroxyl group is directly connected to at least one hydrogen atom.

2. The process for the production of urethane substances, suitable as assistants for the textile and allied industries, which comprises reacting an aliphatic amino acid corresponding to the general formula X—NH—R—COOH, in which X denotes a hydroxy-alkyl radicle and R an alkyl radicle, with a chlorocarbonic ester of an aliphatic alcohol in which the carbon atom bearing the hydroxyl group is directly connected to at least one hydrogen atom in the presence of an aqueous solution of a quantity of alkali sufficient for neutralization of the hydrochloric acid formed.

3. The process for the production of urethane substances, suitable as assistants for the textile and allied industries, which comprises reacting an aliphatic amino acid corresponding to the general formula X—NH—R—SO₃H, in which R denotes an alkyl radicle and X denotes hydrogen or an alkyl radicle, with a chlorocarbonic ester of an aliphatic alcohol in which the carbon atom bearing the hydroxyl group is directly connected to at least one hydrogen atom in the presence of an aqueous solution of a quantity of alkali sufficient for neutralization of the hydrochloric acid formed.

4. The process for the production of urethane substances, suitable as assistants for the textile and allied industries, which comprises reacting an aliphatic amino acid corresponding to the general formula X—NH—R—SO₃H, in which R denotes an alkyl radicle and X denotes a hydroxy-alkyl radicle, with a chlorocarbonic ester of an aliphatic alcohol in which the carbon atom bearing the hydroxyl group is directly connected to at least one hydrogen atom in the presence of an aqueous solution of a quantity of alkali sufficient for neutralization of the hydrochloric acid formed.

5. The process for the production of urethane substances, suitable as assistants for the textile and allied industries, which comprises reacting an alkali metal salt of an aliphatic amino acid containing at least one hydrogen atom connected to a nitrogen atom at a temperature between 0° and about 80° C. with a chlorocarbonic ester of an aliphatic alcohol in which the carbon atom bearing the hydroxyl group is directly connected to at least one hydrogen atom in the presence of an aqueous solution of a quantity of alkali sufficient for neutralization of the hydrochloric acid formed.

6. The process for the production of urethane substances, suitable as assistants for the textile and allied industries, which comprises reacting an alkali metal salt of an aliphatic amino acid containing at least one hydrogen atom connected to a nitrogen atom at a temperature between 0° and about 80° C. with a chlorocarbonic ester of an aliphatic alcohol containing from 5 to 20 carbon atoms and in which the carbon atom bearing the hydroxyl group is directly connected to at least one hydrogen atom in the presence of an aqueous solution of a quantity of alkali sufficient for neutralization of the hydrochloric acid formed.

7. Products, suitable as assistants for the textile and allied industries, essentially comprising urethanes corresponding to the general formula

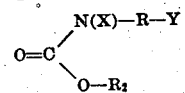

in which R denotes an alkyl radicle, R₁ denotes an alkyl radicle which contains at least 4 carbon atoms, or at least 2 carbon atoms and a hydroxyl group X denotes hydrogen or an alkyl or hydroxy-alkyl radicle and Y denotes —COOZ or —SO₃Z, Z denoting hydrogen or an alkali metal.

8. Products, suitable as assistants for the textile and allied industries, essentially comprising urethanes corresponding to the general formula

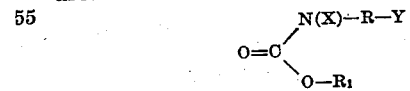

in which R denotes an alkyl radicle, R₁ denotes a hydroxy-alkyl radicle, R₂ denotes an alkyl or hydroxy-alkyl radicle and Y denotes —COOZ or —SO₃Z, Z denoting hydrogen or an alkali metal.

9. Products, suitable as assistants for the textile and allied industries, essentially comprising urethanes corresponding to the general formula

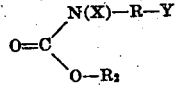

in which R denotes an alkyl radicle, —O—R₂ denotes a radicle of a glycol, X denotes hydrogen or an alkyl radicle and Y denotes —COOZ or —SO₃Z, Z denoting hydrogen or an alkali metal.

10. Products, suitable as assistants for the textile and allied industries, essentially comprising urethanes corresponding to the general formula

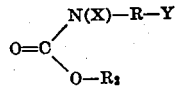

in which R denotes an alkyl radicle, —O—R₂ denotes a radicle of an alcohol containing from 5 to 20 carbon atoms, X denotes hydrogen or an alkyl radicle and Y denotes —COOZ or —SO₃Z, Z denoting hydrogen or an alkali metal.

11. Products, suitable as assistants for the textile and allied industries, essentially comprising urethanes corresponding to the general formula

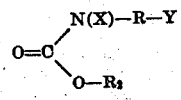

in which R denotes an alkyl radicle, —O—R₂ denotes a radicle of a glycol containing from 4 to 20 carbon atoms, X denotes hydrogen or an alkyl radicle and Y denotes —COOZ or —SO₃Z, Z denoting hydrogen or an alkali metal.

12. Products, suitable as assistants for the textile and allied industries, essentially comprising urethanes corresponding to the general formula

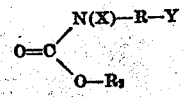

in which R denotes an alkyl radicle containing 1 or 2 carbon atoms, —O—R₂ denotes a radicle of an alcohol containing from 10 to 20 carbon atoms, X denotes hydrogen or an alkyl radicle and Y denotes —COOZ or —SO₃Z, Z denoting hydrogen or an alkali metal.

13. Products, suitable as assistants for the textile and allied industries, essentially comprising urethanes corresponding to the general formula

in which R denotes an alkyl radicle containing 1 or 2 carbon atoms, —O—R₂ denotes a radicle of an alcohol containing 18 carbon atoms, X denotes hydrogen or an alkyl or hydroxy-alkyl radicle and Y denotes —COOZ or —SO₃Z, Z denoting hydrogen or an alkali metal.

14. Products, suitable as assistants for the textile and allied industries, essentially comprising urethanes corresponding to the general formula

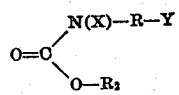

in which R denotes an alkyl radicle containing 1 or 2 carbon atoms, —O—R₂ denotes a radicle of an alcohol containing 18 carbon atoms, X denotes an alkyl or hydroxy-alkyl radicle containing 1 or 2 carbon atoms and Y denotes —COOZ or —SO₃Z, Z denoting hydrogen or an alkali metal.

15. Products, suitable as assistants for the textile and allied industries, essentially comprising a urethane corresponding to the formula

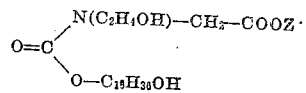

Z denoting hydrogen or an alkali metal.

16. Products, suitable as assistants for the textile and allied industries, essentially comprising a urethane corresponding to the formula

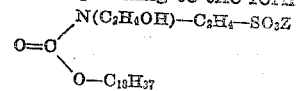

Z denoting hydrogen or an alkali metal.

17. Products, suitable as assistants for the textile and allied industries, essentially comprising a urethane corresponding to the formula

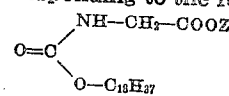

Z denoting hydrogen or an alkali metal.

HEINRICH ULRICH.
KARL SAURWEIN.